(12) United States Patent
Wang

(10) Patent No.: US 7,861,213 B2
(45) Date of Patent: Dec. 28, 2010

(54) MECHANISM FOR DEVELOPING AJAX APPLICATIONS USING JAVA SWING FRAMEWORK AND METHOD FOR USING THE SAME

(75) Inventor: Anping Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1101 days.

(21) Appl. No.: 11/470,104

(22) Filed: Sep. 5, 2006

(65) Prior Publication Data

US 2008/0127217 A1 May 29, 2008

(51) Int. Cl.
*G06F 9/44* (2006.01)
*G06F 9/45* (2006.01)

(52) U.S. Cl. .................. 717/100; 717/108; 709/203

(58) Field of Classification Search ......... 717/100–108, 717/112–118, 120–122; 709/203–204
See application file for complete search history.

(56) References Cited

U.S. PATENT DOCUMENTS

| | | | | |
|---|---|---|---|---|
| 6,687,339 | B2 * | 2/2004 | Martin ..................... | 379/88.14 |
| 7,171,646 | B2 * | 1/2007 | Charisius et al. ............ | 717/100 |
| 7,194,543 | B2 * | 3/2007 | Robertson et al. .......... | 709/226 |
| 7,434,200 | B2 * | 10/2008 | Bender ...................... | 717/100 |
| 7,437,712 | B1 * | 10/2008 | Brown et al. ............... | 717/122 |
| 7,441,233 | B1 * | 10/2008 | Orndorff et al. ............ | 717/125 |
| 7,469,402 | B2 * | 12/2008 | Bender et al. .............. | 717/121 |
| 7,487,201 | B1 * | 2/2009 | Murray et al. .............. | 709/201 |
| 7,512,932 | B2 * | 3/2009 | Davidov et al. ............. | 717/106 |
| 7,565,647 | B2 * | 7/2009 | Davidov et al. ............. | 717/140 |
| 7,584,251 | B2 * | 9/2009 | Brown et al. ................ | 709/206 |
| 7,590,687 | B2 * | 9/2009 | Bales et al. ................. | 709/203 |
| 7,603,651 | B2 * | 10/2009 | De Brabander ............. | 717/105 |
| 7,653,894 | B2 * | 1/2010 | Iszlai et al. ................. | 717/101 |
| 7,707,513 | B2 * | 4/2010 | Broda et al. ................ | 715/804 |
| 7,725,574 | B2 * | 5/2010 | O'Connell et al. .......... | 709/224 |
| 7,752,326 | B2 * | 7/2010 | Smit .......................... | 709/231 |
| 7,783,471 | B2 * | 8/2010 | Vismans et al. ............... | 703/26 |
| 7,793,255 | B1 * | 9/2010 | Kawaguchi et al. ......... | 717/100 |
| 7,797,382 | B2 * | 9/2010 | Bou-Diab .................... | 709/204 |
| 7,797,669 | B1 * | 9/2010 | Rehof et al. ................. | 717/100 |

OTHER PUBLICATIONS

Marchetto et al, "State based testing of Ajax web applications", IEEE, pp. 121-130, 2008.*
Behr et al, "X3DOM A DOM based HTML5/X3D integration model", ACM Web3D, pp. 127-136, 2009.*
Yu et al, "OpenXUP an alternative approach to developing highly interactive web applications", ACM ICWE, pp. 289-296, 2006.*
Puder, "A cross language framework for developing Ajax applications", ACM PPPJ, pp. 105-112, 2007.*

* cited by examiner

*Primary Examiner*—Anil Khatri
(74) *Attorney, Agent, or Firm*—Aka Chan LLP

(57) ABSTRACT

In one embodiment, a mechanism makes use of AJax to enable Swing applications deployable as Internet applications that runs on a J2EE server. The mechanism enables an application developer to develop and deploy Swing applications to the J2EE server while providing users with the equivalent of a Rich Internet Application (RIA). The mechanism builds a bridge between a browser event model and a server resident Swing UI event model.

29 Claims, 8 Drawing Sheets

MECHANISM FOR DEVELOPING AJAX APPLICATIONS USING JAVA SWING FRAMEWORK AND METHOD FOR USING THE SAME

BACKGROUND OF THE INVENTION

1. Copyright Notice

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

2. Field of Invention

Embodiments of the invention relate, in general, to development of a rich user interface (UI) for web applications in a client server environment. More specifically, embodiments of the invention relate to a mechanism for developing rich UI client applications using a graphical user interface framework.

3. Description of the Background Art

The advent of the internet introduced millions of people to the concept of a browser to provide access to a vast array of web servers and vast amounts of information. While accessing the information with the browser is relatively straight forward, the speedy, efficient and convenient delivery of the information to the user is dependent on the delivery technology embedded in it.

Browsers are but one example of a web application based on a document object model that enables a user to display and interact with text, images, and other information at a website on the World Wide Web or a local area network. This document object model functions as the interface for accessing the arbitrary elements of an XML document and follows a stateless communication scheme where a request by a client is followed by a response from the server. Unfortunately, the server, which is typically a J2EE® server, retransmits the entire document even if only a small portion of the document changes. As the internet and other client-server networks have evolved it has become obvious that this form of information transfer is relatively inefficient.

Many client-server applications are based on the Java® programming language because Java can be used to create complete applications that can be readily distributed among servers and clients in a network. It can also be used to build small interactive application applets for use as part of a document. Applets make it possible for the user to interact with the page on a more granular level.

Many of the client side applications written in Java also use Java Swing to handle the user interface (UI) tasks. Swing provides many components and containers that enable sophisticated UIs such as drag-and-drop, undo, and the ability to develop a customer's own "look and feel," or the ability to choose between several standard looks. Swing components implement the MVC (Model View Controller) architecture so client programs can share centralized information over the internet. MVC, which refers to the model, view, and controller, was originally developed to map the traditional input, processing, output roles into the GUI realm.

This mature technology forms the basis for a vast number of client server applications. However, the fact that Swing applications must run locally severely limits scalability and such applications have achieved only limited success in terms of being deployable in an internet infrastructure notwithstanding the relative ease of programming Swing applications.

Recently, web applications, know as Rich Internet Applications (RIA), have become popular because they provide the features and functionality of traditional desktop applications. RIAs also eliminate the need to click through to another page to see related information. With a rich user interface (rich UIs), it is possible to send only the changed information rather than the entire document. Documents with the rich UI increase bandwidth utilization resulting in less network congestion and faster, more efficient access to relevant information for the user.

Asynchronous JavaScript® and XML or more simply, Ajax, is a bundle of technology for developing and delivering the rich UI over the Internet that has become increasingly popular. Specifically, AJax is a client side technology that enables a UI event to propagate to the server at a more granular level compared to the document data model. However, as a technology, it does not provide ways to bound server implementation to the client side event model nor does it provide a standard way to propagate client events to the server for treatment as does Swing. Further, the difficulty associated with developing a rich UI application environment with AJax has limited the adoption of this technology. Trademarks are the property of their respective owners. J2EE, Java, and JavaScript are registered trademarks of Oracle America, Inc.

Accordingly, developers of web or client-server applications are constrained by the non-scalable Swing technology and the difficult to develop AJAX technology. Thus, the development of the rich UI and inclusion in a web document is not only difficult and time consuming but also expensive because of the need for a lot of hand coding. Further, the lack of a viable migration path from a Swing application to a RIA has limited the ability to deploy existing Swing applications on to the internet or other networks such as an intranet.

What is needed is a mechanism that enables developers to develop scalable client applications with the ease of Java Swing UI applications and run them on a J2EE server while behaving like a RIA. What is further needed is a mechanism that facilitates the migration of existing Swing applications to the RIA model to provide a scalable rich UI. What is still further needed is a mechanism that makes use of AJax to enable Swing applications to be deployable as Internet applications that runs on a J2EE server.

BRIEF SUMMARY OF THE INVENTION

Embodiments of the invention relate, in general, to a rich user interface (UI) development environment. More specifically, embodiments of the invention relate to developing AJax applications using a Java Swing framework to provide a Rich Internet Applications (RIA). Advantageously, with the present invention, it is possible to upgrade existing Swing applications to provide a rich UI without developers having to understand the details of how the internet applications actually function.

In accordance with an embodiment of the present invention, a mechanism facilitates rich UI event communication between server and client in an efficient and cost efficient manner. Developers can develop Java Swing UI applications and run them on a J2EE server while behavior is the identical to Rich Internet Applications (RIA). In particular, the mechanism makes use of Asynchronous JavaScript and XML (AJax) on the client side to develop and deliver a rich UI over the Internet at a more granular level compared to a document data model. With this mechanism, an AJax layer enables Swing applications to be deployable as Internet applications that run on a J2EE server rather than on the desktop.

In accordance with another embodiment of the present invention, a mechanism comprises a software infrastructure that enables efficient web application development and deployment. The mechanism allows developers to leverage tools built for Swing applications and to deploy existing Swing based software into Internet applications without re-coding.

These and other features as well as advantages that categorize the present invention will be apparent from a reading of the following detailed description and review of the associated drawings.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
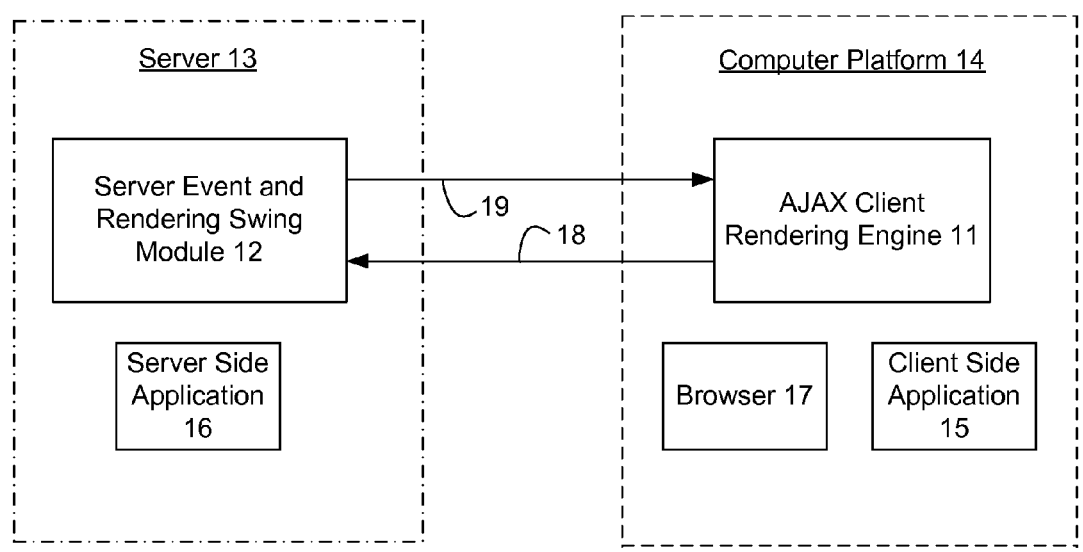
FIG. 1 illustrates an exemplary and simplified client server environment adapted for the deployment of a Swing application in accordance with an embodiment of the present invention.

In the following description of embodiments of the present invention, reference is made to the accompanying drawings that form a part hereof, and in which is shown by way of illustration specific embodiments in which the invention may be practiced. It is to be understood that other embodiments may be utilized and that changes may be made without departing from the scope of the present invention.

Further, in the following description of embodiments of the present invention, numerous specific details are presented to provide a complete understanding of the embodiments of the invention. One skilled in the relevant art will recognize, however, that the invention may be practiced without one or more of the specific details, or with other methods, components, etc. In other instances, well-known structures or operations are not shown or described in detail to avoid obscuring aspects of various embodiments of the invention.

The present invention will now be described with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In the drawings, whenever the same element reappears in subsequent drawings, it is denoted by the same reference numeral.

Refer now to FIG. 1, which is a functional block diagram according to an embodiment of the present invention illustrating the communication flow between an Asynchronous JavaScript and XML (AJax) based client rendering engine 11 and a server event rendering Swing module 12 to achieve a rich user interface for server based Swing applications. In one preferred embodiment, Swing module 12 executes on an application server adapted to execute a Swing application. In another preferred embodiment, server module 12 executes on a Java 2 Platform, Enterprise Edition (J2EE) server that is adapted to execute a Swing application. Regardless of the specific embodiment, the Swing application preferably executes on server 13 rather than on a client desktop. As is well known in the art, a J2EE server is a Java platform designed for the mainframe-scale computing requirements typical of large enterprises.

Computer platform 14 that is capable of executing a client side application 15 in a client server configuration. The client side application 15 may be written in the Java programming language with Java Swing to handle the user interface (UI) tasks. To minimize system resources and to enhance scalability, most of the features and functions reside on server 13 rather than at the client side application 15. Client side application 15 is preferably a browser or other thin client application.

Application 16 is a Java Swing application that is also written in the Java programming language thereby eliminating the need to rewrite existing Java Swing applications. However, rather than executing in the desktop environment, application 16 executes on the server in conjunction with swing module 12. In this embodiment, rendering engine 11 interfaces with application 15 executing on computer platform 14 to receive UI tasks from the user. Rendering engine 11 then passes these tasks to swing module 12, which, in turn, causes application 16 to execute in accordance with the UI tasks provided by the user. Output from application 16 traverses the reverse path from application 16, swing module 12, and rendering engine 11 and is displayed by application 15 for the user.

Java Swing (referred to as Swing) is a graphical user interface (GUI) framework for developing rich UI client applications that are intended to run on a client machine. Note that framework refers to a set of foundations, tool kits, or classes used to build lower level applications and provide functionality like, for example, data logging and error handling. Swing based applications offer a rich UI for better user experience and has a well-understood MVC model. There are also many tools to help developers develop Swing applications. The technology is mature and there are vast amount of applications available in every categories When the Swing application migrates to the server, a user accesses the functions of server resident application 16 through the rendering engine 11 interfaces with browser 17 or other web-based application program. An AJax enabled browser 17 is the preferred mechanism by which a user acquires information from server 13 or gains access to application program 16. AJax enabled refers to logic associated with the browser that enables manipulation of an element within a document model.

In operation, when user initiates a request using browser 17, rendering engine 11 translate a request to initiate (or generate) an event. In some embodiments, as noted above, the user may initiate the request using application 15 instead of browser 17. Regardless of the source of the request, rendering engine 11 transfers the event to server 13 along communication link 18 where Swing module 12 translates the event into an action request for application 16. Asynchronous JavaScript and XML (AJax) provides the granular functionality, at the client side, that enables the user to drag and drop elements of the page or to type in text without having to refresh the entire document each time a change is made.

In response to the action request, application 16 sends a reply to Swing module 12, which in turn sends a rendering along communication link 19 to browser 17 through rendering engine 11. It should be appreciated that although communication links 18 and 19 are shown as separate communication links for purpose of illustration, it is preferred that links comprise a single bi-directional link, such as the internet or an intranet.

Rendering engine 13 and Swing module 17 cooperate to provide a mechanism that facilitates rich UI event communication between server and client in an efficient and cost efficient manner for Java Swing applications. Further, it will be appreciated that the Java Swing applications execute on a J2EE server while behavior is the identical to Rich Internet Application (RIA) on the client side. Advantageously, the mechanism makes use of AJax on the client side to develop and deliver a rich UI over the Internet at a more granular level compared to a document data model.

With this mechanism, an AJax layer in the rendering engine binds with Swing applications deployed as Internet applications running on a J2EE server with the granularity typically associated with a RIA. The embodiments of the present invention make use of AJax to enable Swing applications deployable as Internet applications that runs on a J2EE server without developers having to know how internet applications work.

Figure 2:
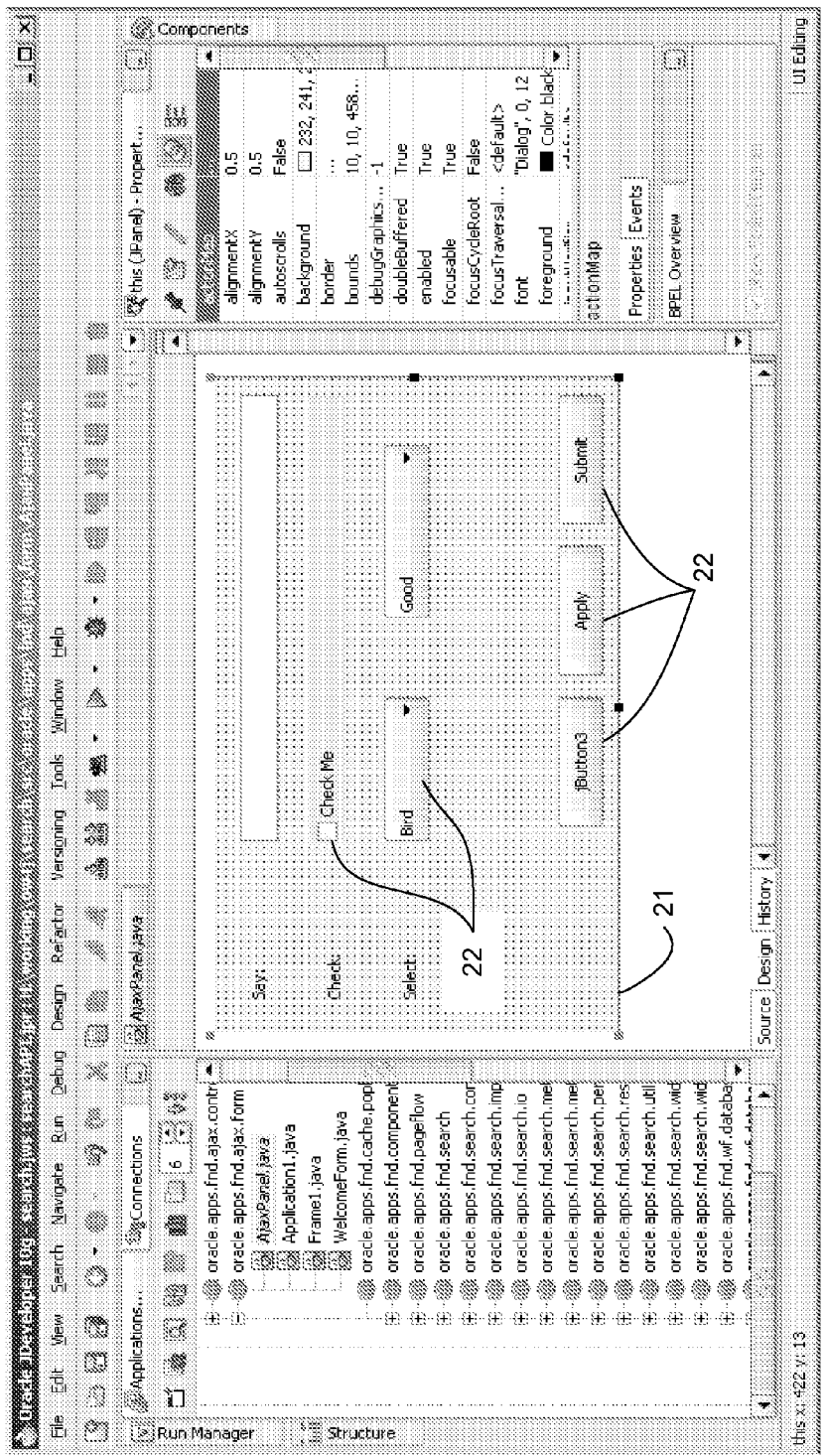
FIG. 2 illustrates an exemplary and simplified development environment in accordance with an embodiment of the present invention.

The mechanism allows application developers to develop a Swing application with a tooling platform or integrated development environment (IDE) 20, such as JDevloper, which is illustrated at FIG. 2, and then to deploy the Swing application to a J2EE server. JDeveloper is a Java IDE commercially available from Oracle Corporation, the assignee of the present invention. JDeveloper provides the tools that developers need for Java and Web services development in a single IDE. It covers the full development lifecycle from design through coding, debugging and optimization and profiling to deploying. Advantageously, the developer need only to concentrate on event handling for the UI component of the application while the mechanism builds a bridge between a browser event model and a Swing UI event model. The mechanism uses AJax to properly handle events at a Swing GUI framework executing on server 13. Note that the framework provided by the present invention correlates the event model to the DOM model and frees the developer from having to write proprietary JavaScript to handle each event.

By way of illustration with reference to FIG. 2, a developer may develop a UI panel 21 using an IDE 20 that executes on server 13. On panel 21, the developer may add controls 22, such as text fields, combo boxes, check boxes, and buttons. An event-handling method is assigned for each control just as would be done in developing a desktop Swing application. Once UI panel 21 is developed, it is deployable to a SwingAJax Server and is accessible over a network such as the Internet. In this manner, the user may surf to a specified domain to access the panel, which is displayed in the client side browser window.

Using IDE 20, a developer may install logic to process events such as a user selection of a tab or menu to the server 13. Standard or often used Swing or logic elements may be stored in library 29. Library 29 also stores a panel registry of available panels. When an event initiates a session, a session manager correlates the request for an application with one of the panels in the registry. Upon receipt of the event, the application on the server side is initiated, the appropriate logic is performed and then rendered back to the user's browsers on the client side. At the user's computer platform, the rendering engine inserts the AJax element into a document model so the browser can render the changed view of the panel.

Figure 3:
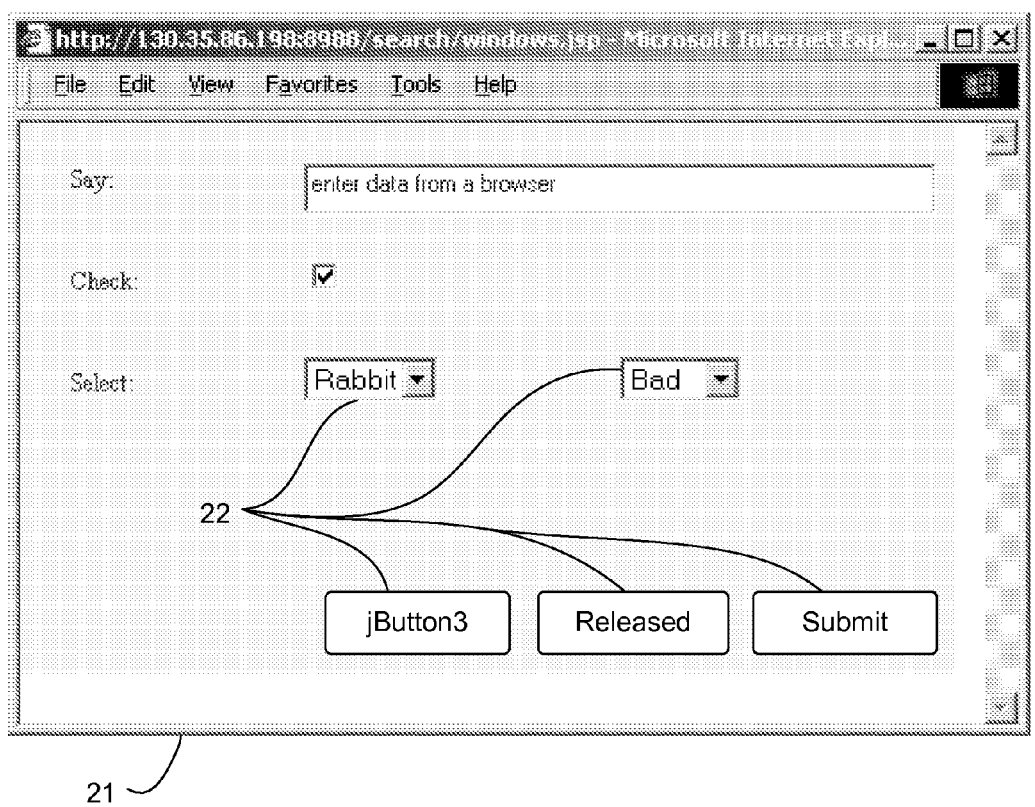
FIG. 3 illustrates an exemplary deployable Swing panel in accordance with an embodiment of the present invention.

FIG. 3 depicts an example of deployable panel 21 as viewed by a user who accesses panel from a client device such as computer platform 14. Panel 21 includes a plurality of controls 22 that the user may access to cause application 16 to perform certain functions. Thus, when a user browses into server resident panel 21, it is possible to interact with controls 22 in the same manner as if the panel was a Swing application deployed on a desktop. At server 13, an event handler causes execution of responsive computer logic of application 16.

Figure 4:
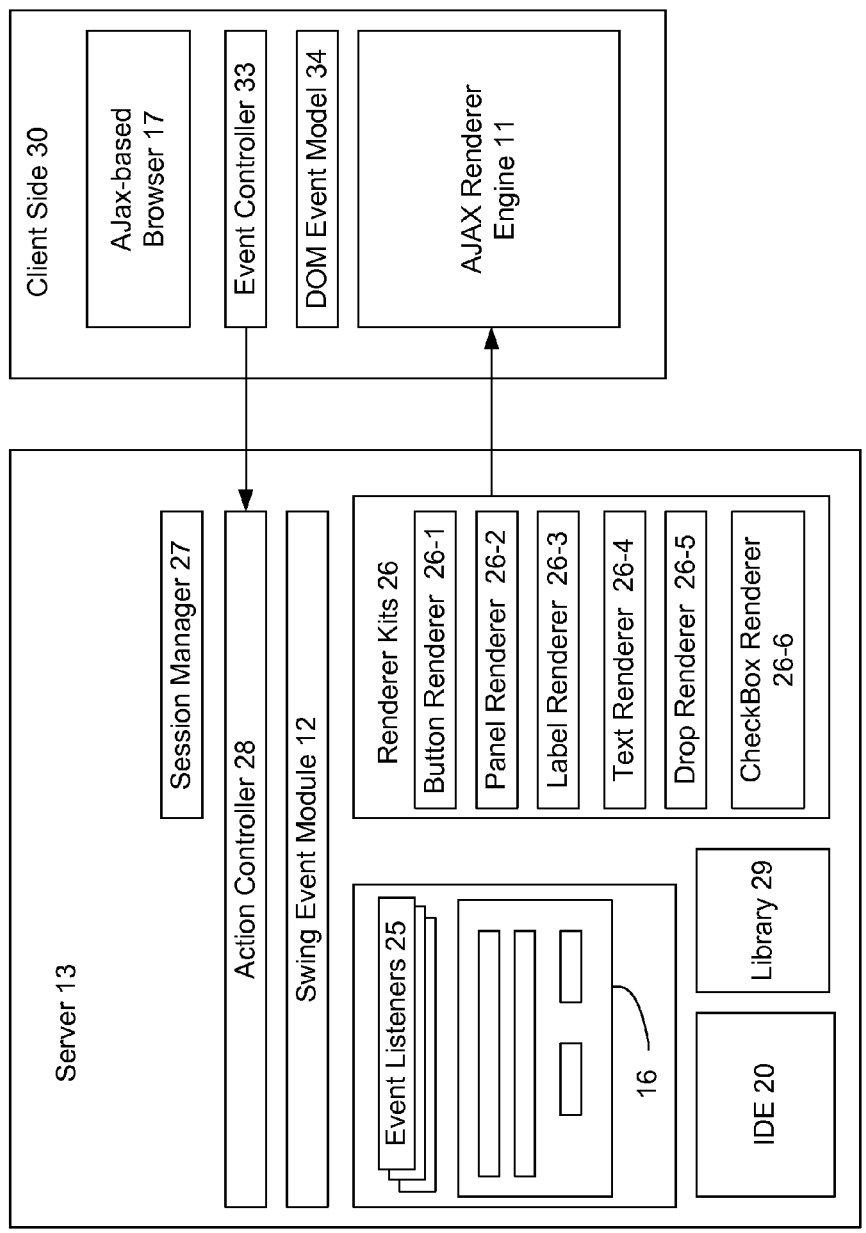
FIG. 4 illustrates a more detailed environment for deployment of a Swing application in accordance with an embodiment of the present invention.

FIG. 4 illustrates a more detailed embodiment of the present invention that facilitates the binding of an AJax browser with a server resident Swing application. In one embodiment, UI events are transferred from a client side 30 AJax browser 17 to a server side 32 Swing application 16. In addition to browser 17, client side 30 includes a rendering engine 11, an event controller 33, and a DOM event model 34. On the server side 31, server 13 includes a swing module 12, a plurality of event listeners 25, rendering kits 26, a session manager 36, and an action controller 37.

The server side 31 also includes an integrated development environment (IDE) 20. IDE 20 comprises a set of tools that developers need for Java and Web services development. In one embodiment, IDE 20 executes on server 13 and provides, by way of example, a source code editor, a compiler and/or interpreter, build-automation tools, a debugger and other tools for simplifying the development of the software. In some embodiments, IDE 20 may also integrate a class browser, an object inspector and a class hierarchy diagram, for use with object oriented software development tools. A developer uses IDE 20 when developing a UI panel deployed on server 13. Users may access the UI panel at a selected URL. In another embodiment, the IDE is resident, and executes, on a client platform such as a development workstation (not shown) that is linked to server 13.

During the development phase, each user control is assigned to one of the plurality of event-handling listener 25 is assigned to handle each control just as would be done in developing a Swing application. The event-handling listeners 25 provide input to application 16. The output generated by application 16 in response to the event is passed to an appropriate rendering kit 26 and then back to the client side 30.

In operation, the components on the client side operate to capture a UI event generated from browser 17 by a Javascript and AJax the event to server side 31. At server side 31, action controller 28 locates the Swing component that is responsible for the event by invoking Swing event model 12. Swing model 12 then calls registered listeners in one of the plurality of event listeners 25. The called event listener 25 may re-render the UI if necessary.

A UI event is raised when a user initiates an action through an input device such as a mouse, keyboard etc. This event has a similar structure, but may vary slightly from device to device, and is passed to an appropriate event controller 33. Event model 34 on the browser side follow a DOM UI event model. Note that the UI event on the Swing model are similar but not entirely identical. The mapping between these two events model enable browser events to be raised on the server side and server side actions (listeners) will be taken per the program specification.

Note that not all the events have to be mapped to a listener. Rather, a subset of events would be enough to make software built in accordance with the present invention to be useful. In general, isolated events, such as mouse click, down, up, key down, key up, key pressed can be mapped while, in one embodiment, mouse movements, dragging, and the like are not. The following table describes the mapping between an event and an associated javascript that will execute upon selection of an event. An event occurs when an element, which is an area on the display such as a drop down box or a button, in the DOM event model is selected. Representative DOM event placeholders are illustrated in Table 1.

UI events are packaged and transported to server 13 via a form through AJax. AJax render engine 11 renders the output from server 13 as result of the UI event. In some embodiments, UI events are grouped before sending to server 13. The boundary of an event group dictates the behavior of the client application. For example, an event group can be very granular—such as moving a cursor across a display device, the motion from pixel to pixel could be deemed an event. However, it generally is preferable to accumulate the indicated motion and transfer the event to the server side once movement across a plurality of pixels has occurred. In other instances, when text is being entered into a region of a web page, the text is transferred to the server in response to a return key rather than after each character is entered.

TABLE 1

| | |
|---|---|
| onload | The onload event occurs when the user agent finishes loading a window or all frames within a FRAMESET. This attribute may be used with BODY and FRAMESET elements. |
| onunload | The onunload event occurs when the user agent removes a document from a window or frame. This attribute may be used with BODY and FRAMESET elements. |
| onclick | The onclick event occurs when the pointing device button is clicked over an element. This attribute may be used with most elements. |
| ondblclick | The ondblclick event occurs when the pointing device button is double clicked over an element. This attribute may be used with most elements. |
| onmousedown | The onmousedown event occurs when the pointing device button is pressed over an element. This attribute may be used with most elements. |
| onmouseup | The onmouseup event occurs when the pointing device button is released over an element. This attribute may be used with most elements. |
| onmouseover | The onmouseover event occurs when the pointing device is moved onto an element. This attribute may be used with most elements. |
| onmousemove | The onmousemove event occurs when the pointing device is moved while it is over an element. This attribute may be used with most elements. |
| onmouseout | The onmouseout event occurs when the pointing device is moved away from an element. This attribute may be used with most elements. |
| onfocus | The onfocus event occurs when an element receives focus either by the pointing device or by tabbing navigation. This attribute may be used with the following elements: A, AREA, LABEL, INPUT, SELECT, TEXTAREA, and BUTTON. |
| onblur | The onblur event occurs when an element loses focus either by the pointing device or by tabbing navigation. It may be used with the same elements as onfocus. |
| onkeypress | The onkeypress event occurs when a key is pressed and released over an element. This attribute may be used with most elements. |
| onkeydown | The onkeydown event occurs when a key is pressed down over an element. This attribute may be used with most elements. |
| onkeyup | The onkeyup event occurs when a key is released over an element. This attribute may be used with most elements. |
| onsubmit | The onsubmit event occurs when a form is submitted. It only applies to the FORM element. |
| onreset | The onreset event occurs when a form is reset. It only applies to the FORM element. |
| onselect | The onselect event occurs when a user selects some text in a text field. This attribute may be used with the INPUT and TEXTAREA elements. |
| onchange | The onchange event occurs when a control loses the input focus and its value has been modified since gaining focus. This attribute applies to the following elements: INPUT, SELECT, and TEXTAREA. |

To provide scalability, each client side application is associated with a server session that is managed by session manager 36. The swing UI tree associated with the DOM model is preferably stored or otherwise associated with the server session. Note that each server session may have multiple swing UI trees but each has a unique id. Each event must contain enough server side information to identify the replica of the UI component on the server side in additional to event data itself.

Upon receipt of UI events from AJax client, the server side 31 constructs a swing event for each incoming client event. The server side 31 invokes Swing module 12 that executes all registered event listeners associated with the particular event.

Each UI event is associated with a session number and each session is managed by session manger 27. Each session may have a limited time span per application server. When timeout happens, the client event will be rejected and the AJax rendering engine 11 handles that gracefully.

Each panel is made deployable by registering the class against the panel registry in library 29. In most cases, when the developer has developed a panel, it may be registered in the registry and then drawn on a client side browser display as part of the framework. When a user clicks on an element, the logic is processed on the server side application. The panel registry and a URL determine the minimum information required to access a server resident application.

Note that not all Swing component need to be supported in a particular embodiment. Rather, only a sub set of selected swing components may be supported in various embodiments to provide the advantages of the present invention.

UI events are passed to server 13 by an AJax module that lives in the client browser. The AJax module may be an applet or a plugin block of code or it may be hard coded into the browser or application. When a user initiates a UI event, the AJax module calls a script that is responsible for packaging event information as well as the component where the event occurred.

Figure 5:
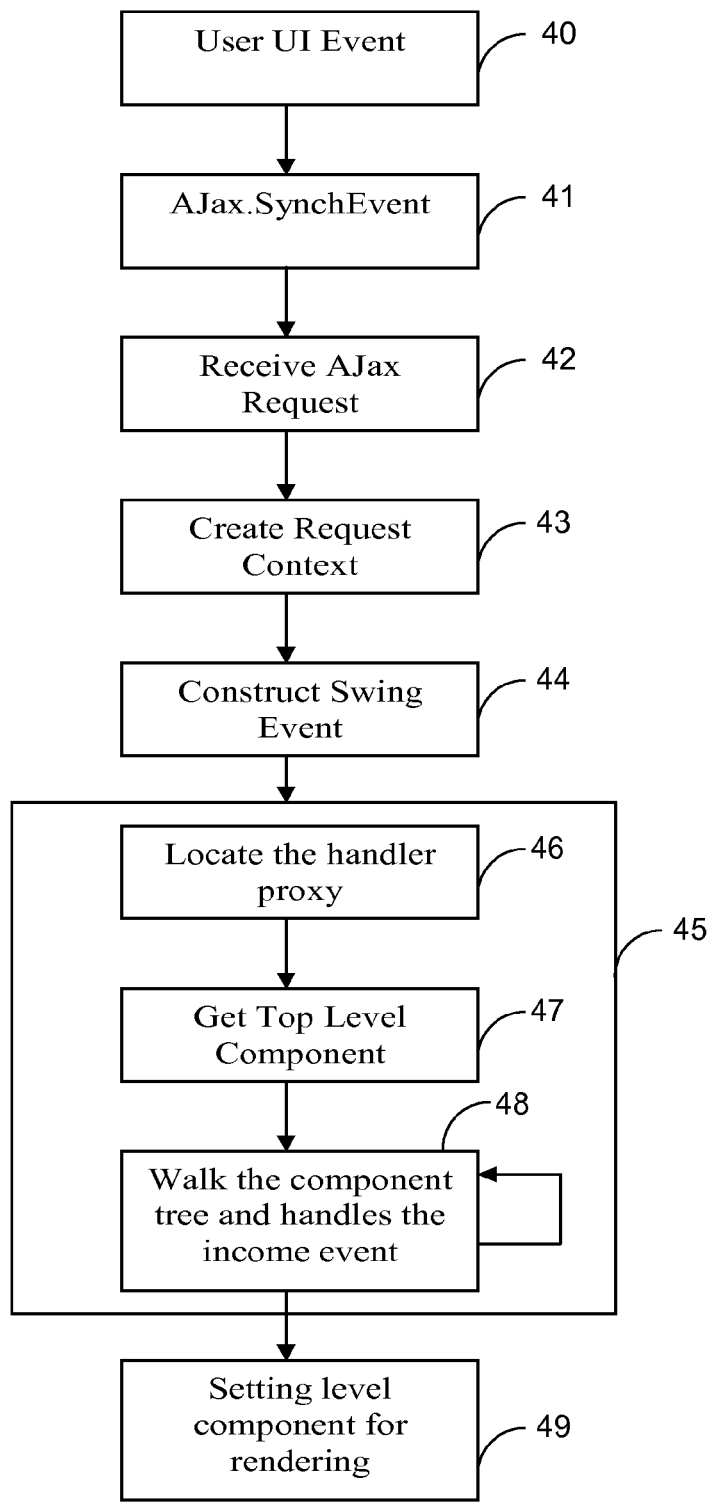
FIG. 5 illustrates a method for accessing a deployable Swing panel in accordance with an embodiment of the present invention.

FIG. 5 illustrates a sequence of operation when a UI event occurs. Specifically, with reference to FIG. 4, the sequence of operation begins, as indicated at 40, when a UI event occurs. UI events are generated when a user manipulates the graphical desktop environment by, for example, selecting a check box or a drop down menu or by typing text. As indicated at 41, event controller 33 generates an AJax.sync event that is then passed to action controller 37. The AJax.sync event includes a session ID that identifies the client.

As indicated at 42, action controller 28 at server 13 receives the AJax.syn event and registers the event with session manager 36. The event is then passed to Swing module 12 where a request context is created as indicated at 43. Swing module 12 then constructs a Swing event as indicated at 44. Once the Swing event is constructed, server side code 31 functions to execute the appropriate logic of application 16 as indicated generally at 45. Specifically, Swing module 12 locates the corresponding event listener 25 that acts as the proxy handler as indicated at 46 and passes the Swing event to the event controller. The event listener 25 then gets the top level component as indicated at 47 and walks the component tree on the server side 31. It also handles the incoming event as indicated at 48. The output of application 16 is then set for rendering the component as indicated at 49.

Figure 6:
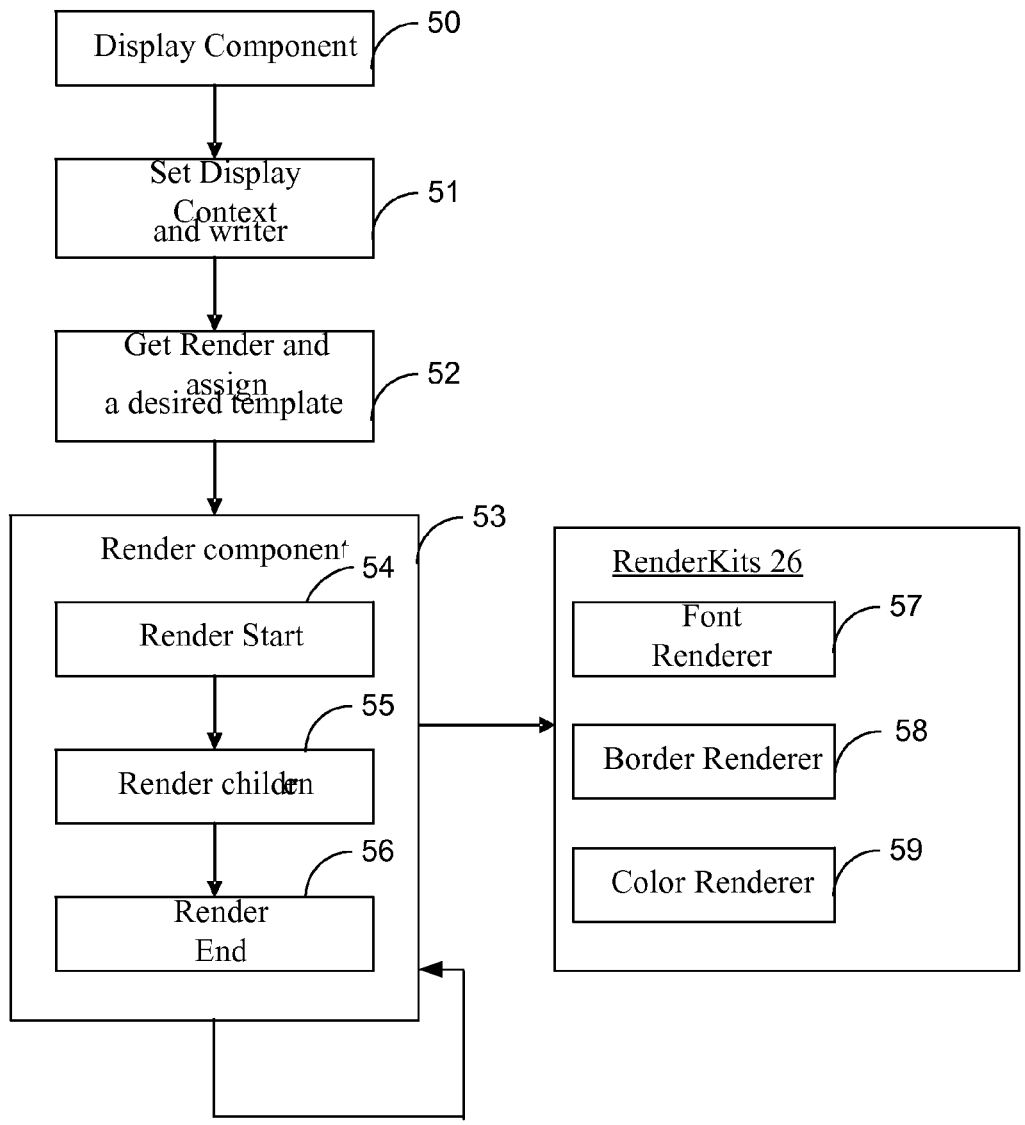
FIG. 6 illustrates a method for rendering a Swing panel in accordance with an embodiment of the present invention.

FIG. 6 illustrates the rendering process in more detail in accordance with an embodiment of the present invention. Specifically, rendering refers to the process for writing a Swing component and its children into a string representation that will be understood and displayable on the client side 30 whether in browser 17 or other client application 15 (FIG. 1). As indicated at 50, the components for display are generated by the logic associated with application 16. As indicated at 51, the display context and writer are set. Rendering code is then accessed and a selected template is assigned as indicated at 52. The rendering code includes a plurality of components 53 that function to initiate and render the components as indicated at 54-56. Rendering requires the identification of a specialized renderer for each type of component and writing the components one by one. The rendering process walks down the component tree until it exhausts all the components from the top-level component. When the components are exhausted, one or more of a plurality of render kits 26 are selected to set the font, border or color as indicated at 57-59. The output of render kits 26 is transferred to the render engine 11 (FIG. 4) and integrated into the DOM model by DOM event model 34.

Figure 7:
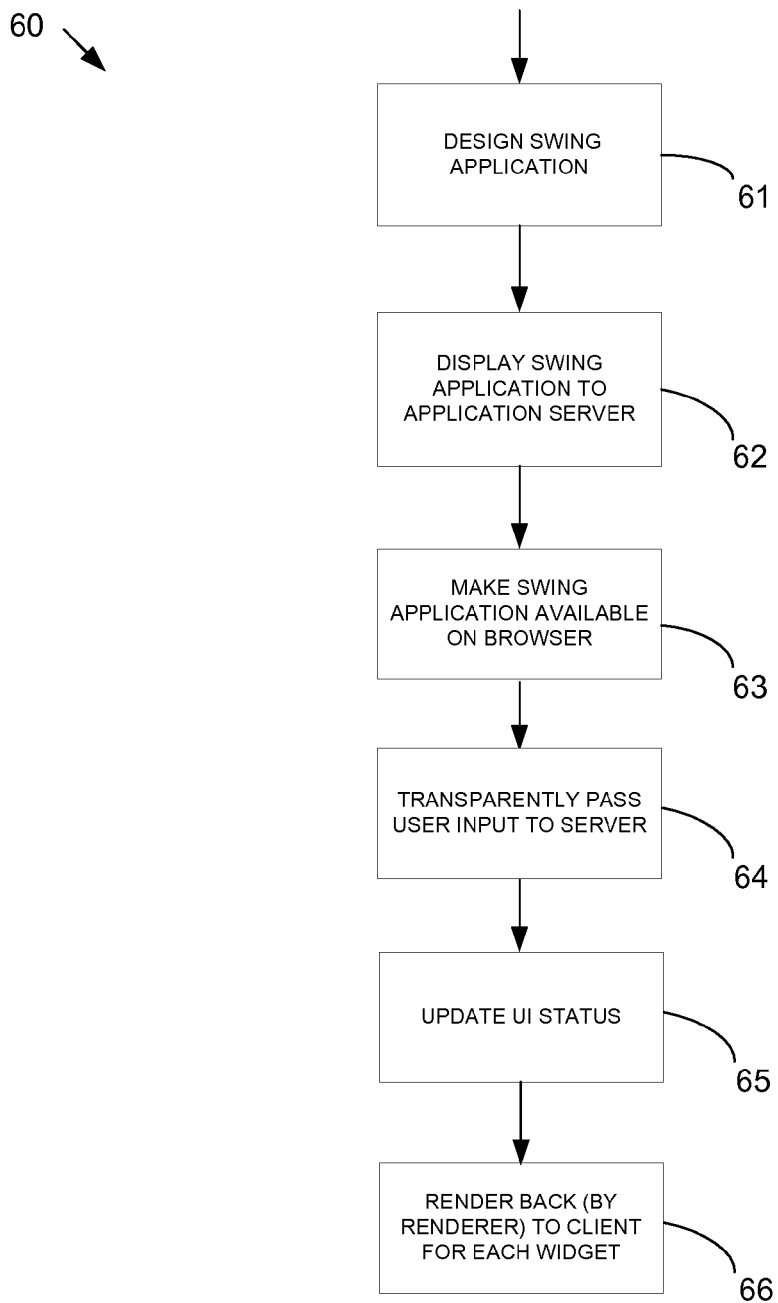
FIG. 7 illustrates a method for developing a deployable Swing panel in accordance with an embodiment of the present invention.

FIG. 7 illustrates a scalable method 60 for implementing Java Swing applications on a J2EE server while providing behavior similar to a rich UI environment. Method 60 facilitates the migration of existing Swing applications to the RIA model and make use of AJax to enable Swing applications to be deployable as Internet applications from a J2EE server. Specifically, at 61, a designer may design or adapt a Swing application using IDE 20 (FIG. 4) to display the Swing application to server 13 as indicated at 62. By accessing a URL, the Swing application is available on the user's browser 17 as indicated at 63. Components of the browser 17 transparently pass user input to server 13 by accessing an AJax module within browser 17 as indicated at 64. The Swing application 16 on server 13 updates the UI status based on the received input as indicated at 65 and then renders back to client each time a change is make to the UI as indicated at 66.

Figure 8:
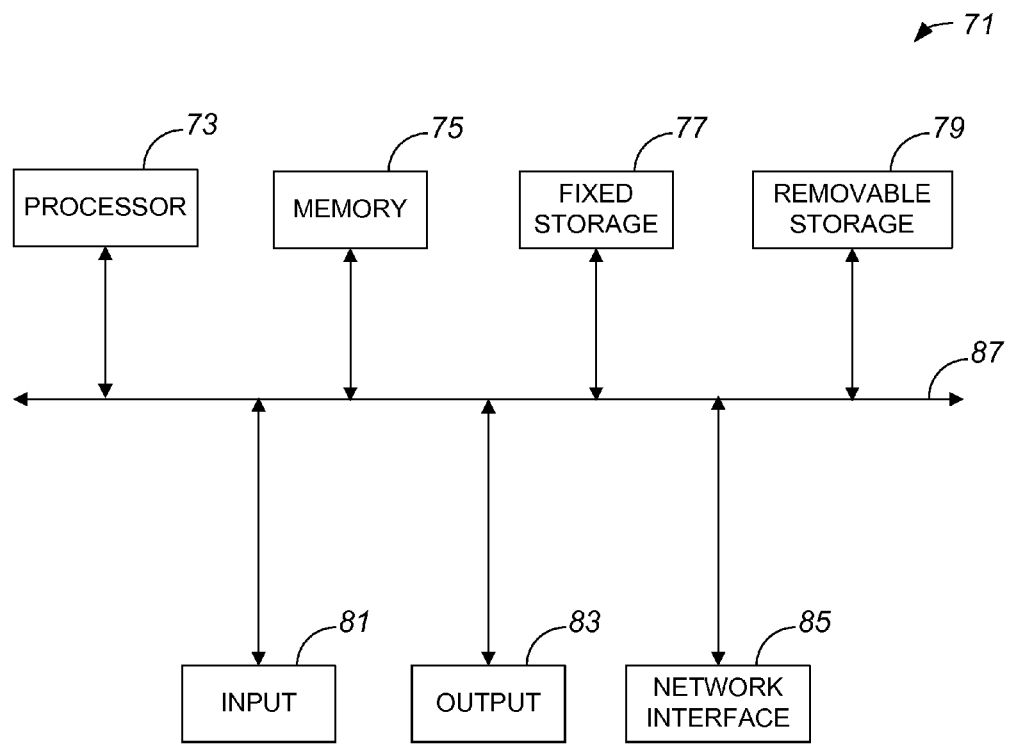
FIG. 8 is a block diagram representation of a computing system that may be utilized in association with the embodiments of the present invention.

FIG. 8 shows a block diagram of components that may be present in computer systems that implement embodiments of the invention. A computer system 71 includes a processor 73 that executes instructions from computer programs, including operating systems. Processor 73 may be utilized for implementing the functionality of either the server 13 or client platform. In embodiments of the present invention, the client side and the server side are merely labels used to denote the relative operational relationship. In other embodiments, client platforms connected in a peer to peer configuration implement the invention.

Although processor 73 typically has memory caches, processor 73 may further utilize memory 75 to store instructions or computer code and data to implement embodiments of the present invention.

Processor 73 may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed.

A fixed storage 77 may store computer programs and data. Fixed storage 77 is typically persistent, and provides more storage than memory 75. One typical fixed storage 77 for databases comprises multiple hard drives, although it should be understood that fixed storage 77 maybe be any suitable component. A removable storage 79 provides mobility to computer programs and/or data that are stored thereon. Removable storage 79 may include, but is not limited to, mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Memory 73, fixed storage 77 and removable storage 79 provide examples of computer-readable storage media that may be utilized to store and retrieve computer programs incorporating computer codes or code devices that implement the invention, data for use with the invention, and the like. Additionally, a data signal, e.g., in a network including the Internet, may also be a computer-readable storage medium. An input device 81 allows a user to interface with computer system 71. Input device 81 may be a keyboard, a mouse, buttons, dials, or any other suitable input mechanism. An output device 83 generally allows system 71 to provide output to the user. Output device 83 may include, but is not limited to, devices such as monitors, display screens, LEDs, printers, or substantially any other output mechanism.

Additional peripherals may be connected to the system through a network interface 85 or other interface such as serial, parallel, or universal serial bus (USB) interfaces.

Network interface 85 typically allows system 71 to interface with a network to which it is connected. The system bus architecture of computer system 71 is represented by arrows 87. The components shown in FIG. 8 may be found in many computer systems. However, components may be added, deleted, and combined without departing from the spirit or the scope of the present invention. For example, fixed storage 77 may be a file server that is accessed through a network connection. Thus, FIG. 8 is for illustration purposes and not limiting.

In one embodiment, a user utilizes one implementation of computer system 71 to execute an AJax browser to access another implementation of computer system 71 configured to function as server 13 where a Swing application executes.

The present invention enables developers to develop scalable client applications with the ease of Java Swing UI applications and run them on a J2EE server while the user obtains an RIA experience. Embodiments of the present invention facilitates the migration of existing Swing applications to the RIA model while making use of AJax to enable Swing applications to be deployable as Internet applications that runs on a J2EE server.

Although the present invention has been discussed with respect to specific embodiments thereof, these embodiments are merely illustrative, and not restrictive, of the present invention.

Any suitable programming language can be used to implement the routines of an embodiment of the present invention including C, C++, C#, Perl, Java, JavaScript, AJAX, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as standalone routines occupying a substantial part, or an in-substantial part of the system processing.

A computer-implemented version of the invention may be embodied using, or reside on, computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device. The source code of the software of the present invention may also be stored or reside on mass storage device (e.g., hard disk, magnetic disk, tape, or CD-ROM). As a further example, code of the invention may be transmitted via wires, radio waves, or through a network such as the Internet.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. For web applications, a mechanism comprising:
   an AJax enabled application for capturing an event from a Swing panel;
   a client resident event controller for transferring the event to a server;
   a rendering engine for building a document object model (DOM) based on renderings received from the server;
   a DOM event model for re-rendering a client view of the Swing panel;
   a computer display device for displaying the Swing panel;
   an action controller for receiving the event from the client resident event Controller;
   a Swing module for determining a context of the event and for associating the event with one of a plurality of server resident event listeners;
   a server resident Swing application controllable by at least one of the plurality of sever resident event listeners;
   a renderer kit for rendering an output of the Swing application back to the rendering engine when a change in the display of the Swing panel occurs; and
   a component responsible for the event, the rendering engine being arranged to translate the component into a string representation, and the string representation being arranged to be displayable on the Swing panel.

2. The mechanism of claim 1 further comprising an input device for selecting a portion of a web page to initiate an event.

3. The mechanism of claim 1 wherein the event comprises a JavaScript™ event.

4. The mechanism of claim 1 wherein the AJax enabled application is a browser.

5. The mechanism of claim 1 wherein the Swing module executes on an application server adapted to execute the Swing application.

6. The mechanism of claim 1 further comprising a session manager for identifying a source of the event.

7. The mechanism of claim 1 further comprising a tooling platform for developing the Swing panel.

8. The mechanism of claim 1 further comprising an integrated development environment (IDE).

9. The mechanism of claim 8 wherein the IDE comprises a Java IDE adapted to develop and deploy the Swing panel.

10. The mechanism of claim 1 wherein the action controller is arranged to locate a source of the event, the source of the event being a Swing component.

11. The mechanism of claim 1 wherein a server resident event listener, associated with the event, is arranged to obtain a top level Swing component from a component tree and to walk the component tree, the Swing component being arranged to be displayed on the Swing panel.

12. The mechanism of claim 1 wherein the DOM event model is arranged to integrate the output of the Swing application into the DOM.

13. The mechanism of claim 1 wherein the DOM is associated with a Swing user interface tree, the Swing user interface tree being arranged to be associated with a server session.

14. The mechanism of claim 1 wherein user interface events associated with the Swing module are different from user interface events associated with the DOM event model.

15. The mechanism of claim 1 wherein the server resident Swing application executes in conjunction with the Swing module.

16. The mechanism of claim 1 wherein the rendering engine translates at least one child of the component into a string representation.

17. A method for executing a Swing application deployed on a server from a client resident application, the method comprising:
    capturing an event from the client resident application;
    transferring the event to a server side Swing application;
    using a processor at the server side, locating a Swing component that is responsible for the event wherein the locating a Swing component comprises invoking a Swing event model to call registered listeners associated with the event, the registered listener being arranged to get a top level component and walk the component tree until components from the top level component are exhausted; and
    re-rendering a user interface if required.

18. The method of claim 17 further comprising providing a tooling platform for developing a Swing panel.

19. The method of claim 17 further comprising providing an integrated development environment for developing a Swing panel deployable on a J2EET™ server.

20. The method of claim 17 wherein the client side application is a browser.

21. The method of claim 17 further comprising:
    at the server side, identifying a specialized renderer for the Swing component that is responsible for the event; and
    rendering the component using the specialized renderer.

22. The method of claim 21 wherein the specialized renderer is a font renderer, border renderer, or color renderer.

23. For a web application, a system for developing and deploying a Swing panel, the system comprising:
    a Swing application displayed on an application server, the Swing application controllable by at least one of a plurality of sever resident event listeners;
    a client side AJax enabled browser for accessing the Swing application;
    means for detecting user selections at the browser and passing the selections to the server;
    an action controller for receiving the selections;
    a Swing module for determining a context of the selections and for associating selections with one of a plurality of server resident event listeners; and
    means for rendering an output of the Swing application at the browser on a display device.

24. The system of claim 23 further comprising an integrated development environment for designing and deploying a Swing panel.

25. The system of claim 23 wherein the detecting means comprises an event controller for passing Javascript™ events to the application server.

26. The system of claim 23 wherein the rendering means comprises a set of render kits.

27. The system of claim 26 wherein the output of the render kits is passed to a client side AJax rendering engine and converted to a Document Output Model (DOM).

28. The system of claim 23 wherein the Swing application is arranged to update a user interface status based on the user selections and to render back to the client when a change is made to the user interface.

29. A machine-readable storage medium including instructions executable by one or more processors, the machine-readable storage medium comprising:
    one or more instructions for displaying a Swing application to an application server, the Swing application controllable by at least one of a plurality of sever resident event listeners;
    one or more instructions for accessing the Swing application from a client resident application and to transparently pass user input to the application server;
    one or more instructions for receiving user input from a client resident event controller;
    one or more instructions for determining a context of the user input and for associating the user input with one of a plurality of server resident event listeners; and
    one or more instructions for updating user input (UI) status and rendering back to the client resident application.

* * * * *

UNITED STATES PATENT AND TRADEMARK OFFICE
CERTIFICATE OF CORRECTION

PATENT NO. : 7,861,213 B2
APPLICATION NO. : 11/470104
DATED : December 28, 2010
INVENTOR(S) : Anping Wang Page 1 of 1

It is certified that error appears in the above-identified patent and that said Letters Patent is hereby corrected as shown below:

In column 2, line 15, delete "Ajax," and insert -- AJax, --, therefor.

In column 12, line 19, in claim 1, delete "Controller;" and insert -- controller; --, therefor.

In column 13, line 26, in claim 19, delete "J2EET™" and insert -- J2EE™ --, therefor.

Signed and Sealed this
Twentieth Day of September, 2011

David J. Kappos
*Director of the United States Patent and Trademark Office*